United States Patent
Chawla et al.

(10) Patent No.: US 6,442,067 B1
(45) Date of Patent: Aug. 27, 2002

(54) RECOVERY ROM FOR ARRAY CONTROLLERS

(75) Inventors: Rohit Chawla, Spring; Scott W. Dalton, Tomball, both of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/576,849

(22) Filed: May 23, 2000

(51) Int. Cl.$^7$ .............................................. G11C 16/04
(52) U.S. Cl. ............................ 365/185.11; 365/185.08; 365/185.33
(58) Field of Search ................. 365/185.11, 185.08, 365/185.33

(56) References Cited

U.S. PATENT DOCUMENTS

| | | | | |
|---|---|---|---|---|
| 4,327,410 A | * | 4/1982 | Patel et al. | 364/200 |
| 5,623,604 A | * | 4/1997 | Russell et al. | 395/200.1 |
| 5,838,614 A | * | 11/1998 | Estakhri et al. | 365/185.11 |
| 5,928,336 A | * | 7/1999 | Takeuchi | 710/1 |
| 5,999,476 A | * | 12/1999 | Dutton et al. | 365/230.01 |
| 6,104,638 A | * | 8/2000 | Larner et al. | 365/185.3 |
| 6,262,918 B1 | * | 7/2001 | Estakhri et al. | 365/185.33 |

* cited by examiner

Primary Examiner—Richard Elms
Assistant Examiner—Tuan T. Nguyen
(74) Attorney, Agent, or Firm—Conley, Rose & Tayon, P.C.; Michael F. Heim; Mark E. Scott

(57) ABSTRACT

A computer system has a ROM device containing two separately flashed areas. Each area contains a firmware image. From the factory, the two firmware images are identical. Each image also contains the executable code to flash an image area. The ROM also contains a "boot block" sector that makes decisions as to which of the firmware images is the "active" image and which is the "inactive" image. The active image is copied from the ROM to a RAM device and executed from RAM during normal system operation. The inactive image normally is not executed. The boot block sector also contains code that performs a checksum verification on the active image during initialization and, if the checksum fails, switches the active/inactive status of the two firmware images to make the previously inactive image the active image. With two firmware images, the system can recover from a power failure occurring while flashing the ROM because the other firmware image is still available.

19 Claims, 4 Drawing Sheets

US 6,442,067 B1

RECOVERY ROM FOR ARRAY CONTROLLERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to non-volatile memory devices. More particularly, the invention relates to a non-volatile memory device on which executable code is stored, that can tolerate a failure during reprogramming of the memory device. More specifically still, the invention relates to a reprogrammable Read Only Memory ("ROM") device that can recover from an interruption during a "flash" operation to rewrite the ROM.

2. Background of the Invention

Computer systems include various types of memory devices. Some memory devices are referred to as "volatile" meaning that the data stored on the memory device is lost once power is turned off to the device. Other memory devices are "non-volatile" which means they retain their data even if power is removed from the device.

Memory devices are used for a variety of purposes. For example, non-volatile memory, such as dynamic random access memory ("DRAM"), or more specifically synchronous DRAM ("SDRAM"), typically is used as the computer's main system memory. Upon boot up, the computer's operating system is copied into the main system memory and executed by the processor from that memory. As the user opens applications, each application also is copied from the storage drive (e.g., hard drive, CD ROM drive) on which the application is permanently stored into the main system memory from where it is executed. Main system memory also used to temporarily store data, configuration information, and other types of information that the computer may use during operation.

Non-volatile memory is useful for storing executable code that the computer may execute each time it is powered up. Such code is referred to as "firmware." By way of example, most computer's have a set of executable routines called the Basic Input/Output System ("BIOS") that provide access to various input and output device such as floppy disk drives and the display. The BIOS code is permanently stored on a non-volatile memory device called a Read Only Memory ("ROM"). Instructions can be retrieved much faster from RAM than ROM. Accordingly, during the boot up process, the BIOS code is copied from the ROM device to the computer's main system memory and, when needed, executed from main system memory.

Computers often have more than one processor besides the main processor. For example, some computers have a disk drive controller which writes data to or read from a disk drive. A disk controller may have its own processor. An example of a disk controller is a disk array controller often used in server systems to interface to an array of disk drives. The disk array controller circuit often is implemented on a separate add-in board. The circuit fabricated on the board includes a processor, a ROM, RAM, and other components necessary to interface the server to the drives. The ROM contains the firmware code that is executed by the disk array controller board's processor. During system initialization, the array controller's firmware is copied from the ROM to RAM on the disk array controller board and executed from RAM by the processor on the board.

It may be desirable to change the firmware code on the ROM. Enhancements to the code, for example, can increase performance. Some types of ROM devices permit the contents of the ROM to be changed. An Electrically Erasable Programmable Read Only Memory ("EEPROM") is one such type of ROM. To reprogram an EEPROM (a process referred to as "flashing" the ROM), the device first is erased and then written with new data. The flash process requires executable code to perform the erasure and subsequent write.

A problem has been observed regarding flashing of EEPROMs particularly on disk array controller boards, although the problem may be present in other subsystems of the computer. The code necessary to perform the flash may be included as part of the firmware on the array controller's ROM that is to be flashed (i.e., upgraded). That is, the code to be upgraded contains the set of executable instructions necessary to perform the upgrade. Because the code is executed from RAM, which is volatile memory, and the ROM first is erased before being rewritten with the upgraded code, a loss of power, or other type of interrupting event, during the flash process may render the array controller board useless. If power is lost during the flash process, the code that was stored in RAM disappears because of the volatile nature of RAM. In addition, the code that was stored on the ROM itself is lost because the flash process first erased the ROM. At this point, the code to be upgraded is gone from the array controller board, and because that code contained the instructions necessary to perform the flash, the mechanism to perform the flash also is lost. A disk array controller that experiences this problem may have to be sent back to the factory where specialized equipment is used to reprogram the ROM or to replace the ROM with a ROM containing new code. This scenario is highly inconvenient and undesirable for the user and thus, a solution is needed which can permit a recovery by the user if power is lost during a ROM flash. The solution should be one that requires minimal user involvement and avoids having to ship the computer or the array controller board back to the factory.

BRIEF SUMMARY OF THE INVENTION

The problems noted above are solved in large part by a computer system having a ROM device containing two separately flashed areas. Each area contains a firmware image. From the factory, the two firmware images are identical. Each image also contains the executable code to flash an image area. The ROM also contains a "boot block" sector that makes decisions as to which of the firmware image is the "active" image and which is the "inactive" image. The active image is copied from the ROM to a RAM device and executed from RAM during normal system operation. The inactive image normally is not executed. The boot block sector also contains code that performs a checksum verification on the active image during initialization and, if the checksum fails, switches the active/inactive status of the two firmware images to make the previously inactive image the active image.

With two separately flashed firmware image areas, the ROM can recover if a power failure interrupts a flash operation. When the user wishes to perform a firmware upgrade, or otherwise change the firmware, the inactive image is erased and then rewritten with new firmware. Because the active image has not been erased at this point and still contains valid, executable code, a power failure occurring while the inactive image is being flashed can be tolerated because the active image is still valid and available.

After the inactive image is successfully flashed, assuming no power loss interrupted that process, the active image is erased and flashed with the new firmware thereby making both images once again identical. Alternatively, before flashing the active image area, the user is afforded the opportunity to determine whether to accept the new firmware or to revert back to the "old" firmware. This is accomplished by not flashing the active image immediately after flashing the inactive image. Instead, normal computer operation continues with the inactive image area containing the new firmware and the active image area containing the old firmware. The user can evaluate the system with the new firmware and decide whether to retain it. During or after the next system bootup, the boot block code recognizes that the versions of firmware in the active and inactive ROM areas are not the same and instructs the computer system to prompt the user whether to accept the newly flashed firmware or revert back to the old version. If the user elects to keep the new firmware, the active image area is flashed with new firmware from the inactive area. If however, the user wishes to go back to the old version of firmware, the inactive image area is flashed with the old firmware from the active area.

The ROM and method of flashing described can be used in any subsystem of a computer system or other electronic device. For instance, the ROM can be used in a disk array controller in a server system.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

The term "ROM" is intended to include any type of non-volatile memory device that can be reprogrammed by the user. An example includes an electrically erasable programmable read only memory ("EEPROM").

DETAILED DESCRIPTION OF THE PREFERRED EMBODIMENTS

The problems noted above are solved using a ROM organization and method of flashing the ROM that is explained below. The preferred embodiment of the invention is described in the context of a ROM used on a disk array controller board in a server computer. The disk array controller board permits the server to store data on a plurality of disk drives. However, the preferred ROM solution and method of flashing the ROM can readily be used or extended to other applications as well. In general, the preferred ROM organization is useful anytime a ROM can be flashed wherein the ROM code itself includes the executable instructions necessary to perform the flash and the flashing process can be interrupted, such as by a power loss.

Figure 1:
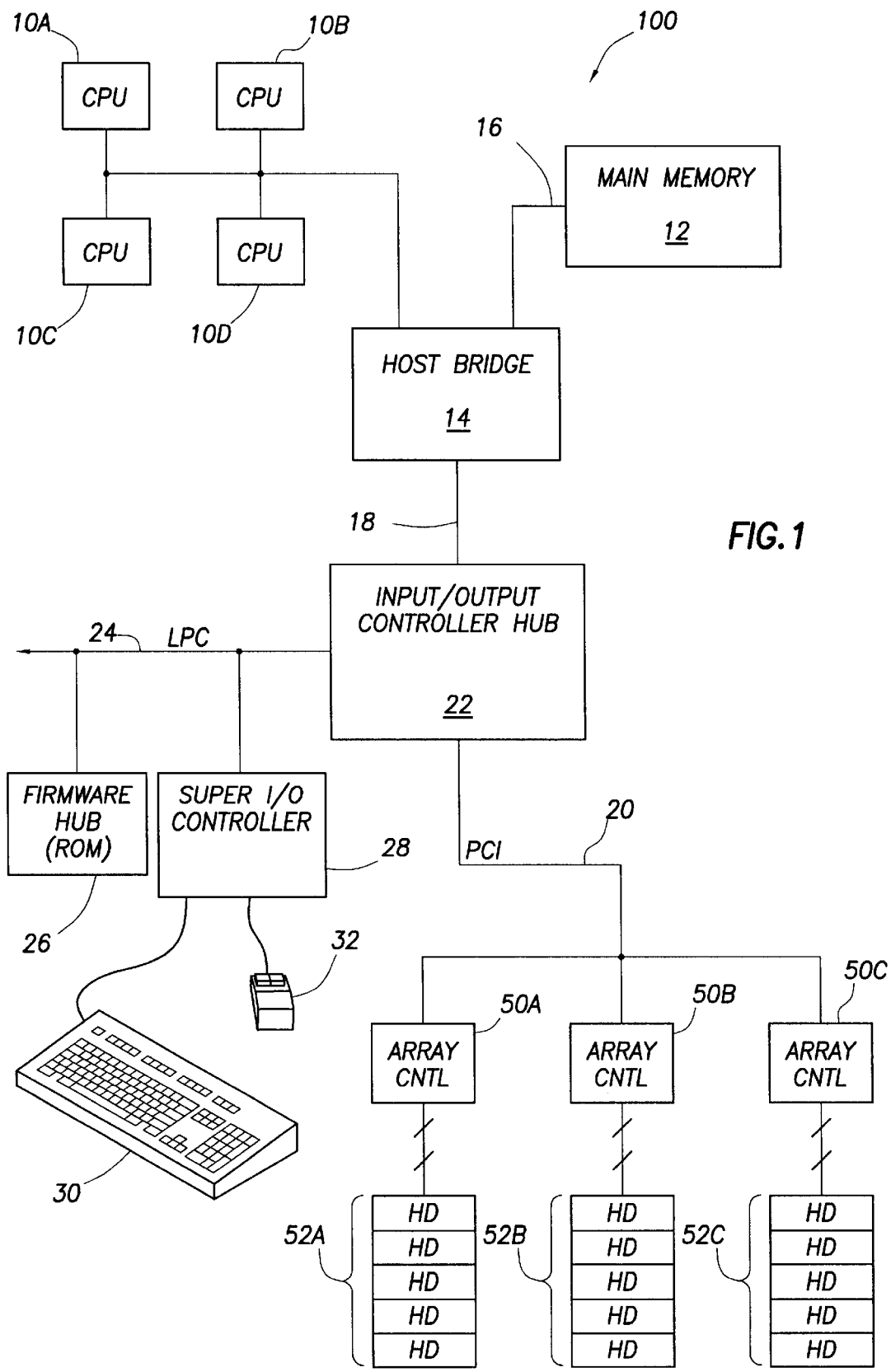
FIG. 1 shows a computer system constructed in accordance with the preferred embodiment of the invention including a plurality of disk array controllers.

Referring now to FIG. 1, computer system 100, constructed in accordance with the preferred embodiment, preferably comprises one or more central processing units ("CPUs") 10, main memory 12, host bridge 14, expansion bus 18, input/output controller hub 22, a firmware hub 26, a super I/O controller 28, one or more disk array controllers 50 and a plurality of disk drives 52. Inasmuch as computer system 100 is preferably a server system, the computer system 100 preferably comprises multiple CPUs 10A, 10B, 10C, 10D arranged as shown in a configuration to permit simultaneous, multi-tasking to occur. The CPUs may comprise, for example, Pentium® III processors from Intel Corp., or other suitable processors. It should be understood that the system 100 can include any number of CPUs.

The CPU array 10 couples to a main memory array 12 and a variety of other peripheral computer system components through an integrated host bridge logic device 14. The main memory array 12 preferably couples to the host bridge logic 14 through a memory bus 16, and the host bridge logic 14 preferably includes a memory control unit (not shown) that controls transactions to the main memory 12 by asserting the necessary control signals during memory accesses. The main memory 12 functions as the working memory for the CPUs 10 and generally includes a conventional memory device or array of memory devices in which program instructions and data are stored. The main memory array 12 may comprise any suitable type of memory such as Dynamic Random Access Memory ("DRAM") or any of the various types of DRAM devices such as Synchronous DRAM ("SDRAM"), Extended Data Output DRAM ("EDO DRAM"), or Rambus™ DRAM ("RDRAM").

Inasmuch as computer system 100 is preferably a server system, the computer system 100 may not have a dedicated display device. If it is desired for the computer system to have a dedicated display device, such a system could be implemented by coupling a video driver card to the host bridge 14 by way of the expansion bus 18 or a separate bus (not shown). If it is desirable for the computer system to have a dedicated display device, a video driver or graphic controller would interface the display device to the system. The display may comprise any suitable electronic display device upon which any image or text can be represented.

In the preferred embodiment shown in FIG. 1, the primary expansion bus 18 comprises a Hub-link bus which is a proprietary bus of the Intel Corporation. However, computer system 100 is not limited to any particular type of primary expansion bus, and thus other suitable buses may be used. Moreover, the architecture shown in FIG. 1 is only exemplary of one suitable architecture, and any suitable architecture can be used.

In addition to the host bridge device 14, the computer system 100 also includes another bridge logic device 22 that bridges the primary expansion bus 18 to various secondary buses including a low pin count ("LPC") bus 24 and a peripheral component interconnect ("PCI") bus 20 (referred to as the "host" PCI bus). In accordance with the preferred embodiment, the bridge device 22 generally controls the flow of data to and from the device to which it connects. Although the ICH 22 of FIG. 1 is shown only to support the LPC bus 24 and the PCI bus 20, various other secondary buses may be supported by the ICH 22 instead of, or in addition to, LPC bus 24 and PCI bus 20.

Referring still to FIG. 1, the firmware hub 26 couples to the ICH 22 by way of the LPC bus 24. The firmware hub 26 preferably comprises a ROM device which contains code that is executable by the CPU array 10. This executable code preferably includes Basic Input/Output System ("BIOS") code that permits the computer to conduct the Power On Self Test ("POST") as well as to communicate with various I/O devices during normal system operations, as would be known by those of ordinary skill in the art.

The super input/output controller 28 also couples to the ICH 22 via LPC bus 24 and controls various system functions including interfacing with various input and output devices such as keyboard 30. The super I/O controller 28 may further interface, for example, with a system pointing device such as a mouse 32, various serial ports (not shown) and floppy drives (not shown).

The computer system 100 of FIG. 1 also includes three disk array controllers 50A, 50B, 50C coupled to the ICH 22 by way of the host PCI bus 20. Each disk array controller preferably is implemented as a separate expansion card, but can also be implemented on the server's main system board which also contain the CPU array 10, main memory 12, host bridge 14, ICH 22, firmware hub 24, and super I/O controller 28. Further, each disk array controller 50 couples to a plurality of hard drives 52A, 52B, 52C. Such a disk drive configuration is typical of the well-known Redundant Array of Independent Disk ("RAID") storage systems. A RAID storage system typically include multiple data drives on which data is stored and a "parity" drive in which parity data is stored. The parity data permits the contents of any one data drive to be calculated in the event one of the drives become non-operational. A RAID system thus is "fault tolerant" meaning that it can recover from a loss of one of its disk drives. RAID storage systems are generally known to those of ordinary skill in the art. It should be understood that while FIG. 1 shows three array controllers 50, computer system 100 may support any number of such controllers.

Figure 2:
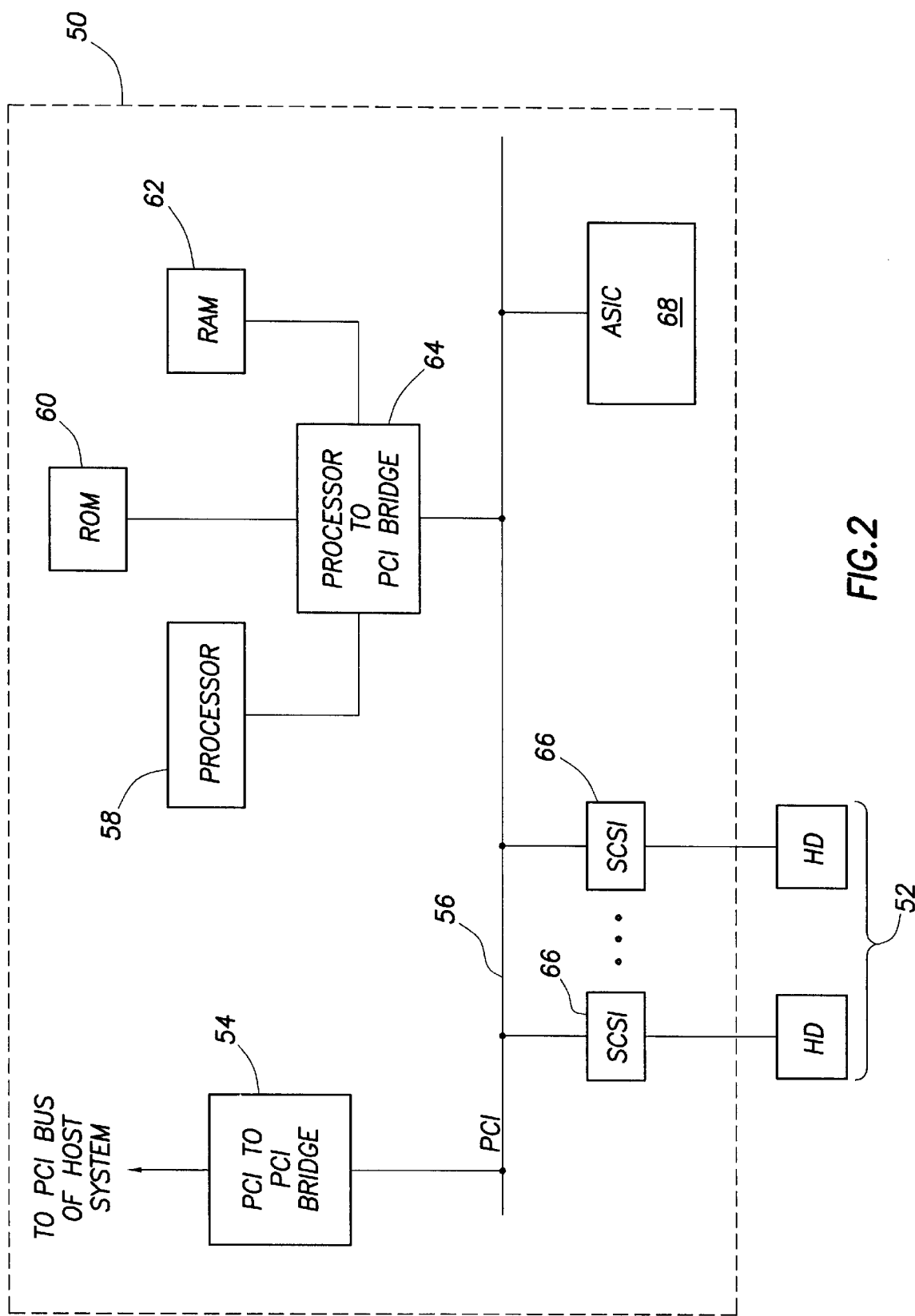
FIG. 2 shows a block diagram of one of the disk array controllers of FIG. 1 including a ROM that, in accordance with the preferred embodiment of the invention, permits recovery of the ROM's firmware in the event of an interruption while flashing the ROM.

FIG. 2 shows the preferred structure of a disk array controller 50 for use in the preferred embodiment of the invention. As shown, the disk array controller 50 preferably includes a PCI-to-PCI bridge 54, a disk array processor 58, a ROM device 60, Random Access Memory ("RAM") device 62, a processor-to-PCI bridge 64, one or more Small Computer System Interface ("SCSI") controllers 66, and an Application Specific Integrated Circuit ("ASIC") 68. Alternatively, Fiber Channel could be used. Other devices may be included as desired.

The PCI-to-PCI bridge 54 couples the host PCI bus 18 (FIG. 1) to a PCI bus 56 which preferably is implemented just on the disk array controller board 50. Because PCI bus 56 is local to the disk array controller 50, the bus is referred to as the disk array controller's "local" PCI bus. The local PCI bus 56 is used to couple together the PCI-to-PCI bridge 54, processor-to-PCI bridge 64, SCSI controllers 66, and ASIC 68. Each hard drive preferably couples to a dedicated SCSI controller 66. Although, FIG. 2 only shows two hard drives 52 and two SCSI controllers 66, the array controller 50 can handle any desired number of hard drives 52. ASIC 68 is used to perform parity calculations in accordance with RAID and functionality.

The processor 58 controls the operation of the disk array controller 50. The processor 58 may comprise a 700 Series Power PC processor (e.g., model 740) manufactured by IBM Corp. However, other microprocessors or microcontrollers may be used as the array processor 58 and still be within the contemplation of this invention. The processor 58 can receive data from the host PCI bus via the PCI-to-PCI bridge 54 and write that data to the appropriate hard drive. The processor can also read data from the appropriate hard drive in response to a read request from the host PCI bus.

In addition to writing data to and reading data from the disk drives 52, the array processor 58 preferably performs other functions specific to the functionality of the disk array controller 50 such as detecting and reporting errors associated with the operation of the disk array controller. The firmware executed by the processor 58 also preferably includes the ability to flash the ROM 60. As explained previously, flashing the ROM permits the firmware stored on the ROM to be replaced which permits the firmware to be upgraded.

The processor 58 also couples to ROM 60 and RAM 62 via the processor-to-PCI bridge 64. The firmware instructions executed by the processor 58 are stored on ROM 60. During initialization of the disk array controller 50, some or all of the firmware is copied from ROM 60 to RAM 62 and executed from RAM 62.

Figure 3:
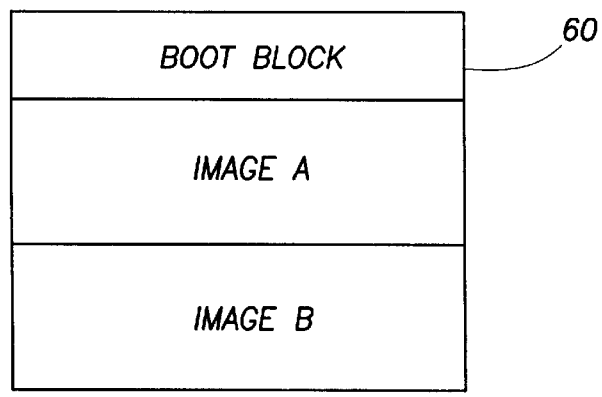
FIG. 3 shows the organization of the ROM of FIG. 2 to preferably include a boot block sector and two separately flashable image areas.

In accordance with the preferred embodiment of the invention, ROM 60 is organized to include two separate firmware "images" as shown in FIG. 3. Referring to FIG. 3, ROM 60 preferably includes at least three areas in which information can be stored. As shown, these areas include boot block code and two firmware images—image A and image B. Each image comprises executable code that can be executed by processor 58 to operate the disk array controller 50. When the ROM 60 is created, programmed and installed in the disk array controller 50, images A and B preferably are identical. As such, from the factory, either firmware image A or B can be used by processor 58 to operate the disk array controller.

Preferably, however, one of the images is designated as "active" while the other image is designated as "inactive." The active image is the image that the processor executes; the inactive image normally is not executed. Either image A or B can be active, and the image not designated as active is the inactive image. The boot block area contains code that keeps track of which image is active and which is inactive and makes decisions as to which image to make active and inactive. The active image is copied into RAM 62 and executed from RAM by processor 58 during normal disk array controller operation. The inactive image preferably is not copied into RAM 62, but can be if desired.

During system initialization, the boot block code uses known techniques to compute a checksum for the active firmware image to determine whether the active firmware has been corrupted on the ROM 60. If the checksum for the active firmware image fails, which indicates a corruption of the code, then the boot block code can designate the inactive firmware image to be the active firmware and the disk array controller can operate using that image. Thus, the boot block code tests the active firmware image and, if the active image is defective, reverses the active and inactive status of the firmware images A and B.

Figure 4:
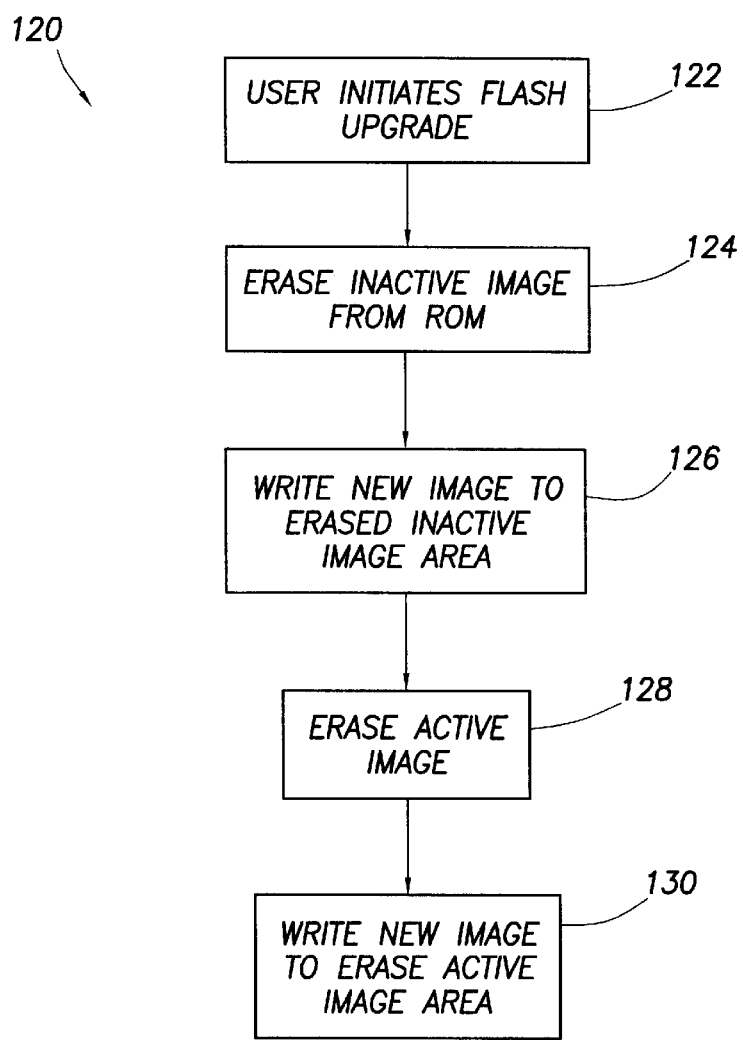
FIG. 4 shows one preferred method for flashing the ROM of FIG. 2.
Figure 5:
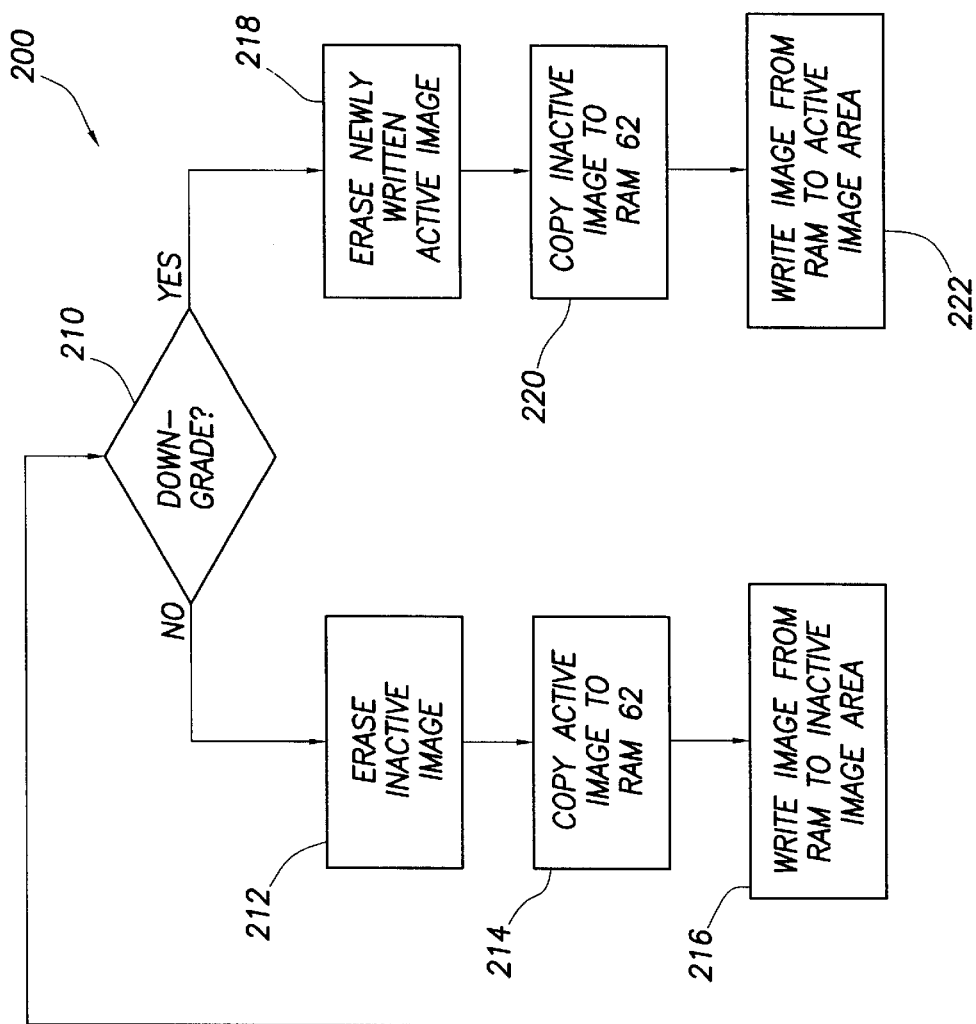
FIG. 5 shows another preferred method for flashing the ROM of FIG. 2 that permits the user to downgrade to the previous version of the ROM's firmware image if desired.
Figure 5:
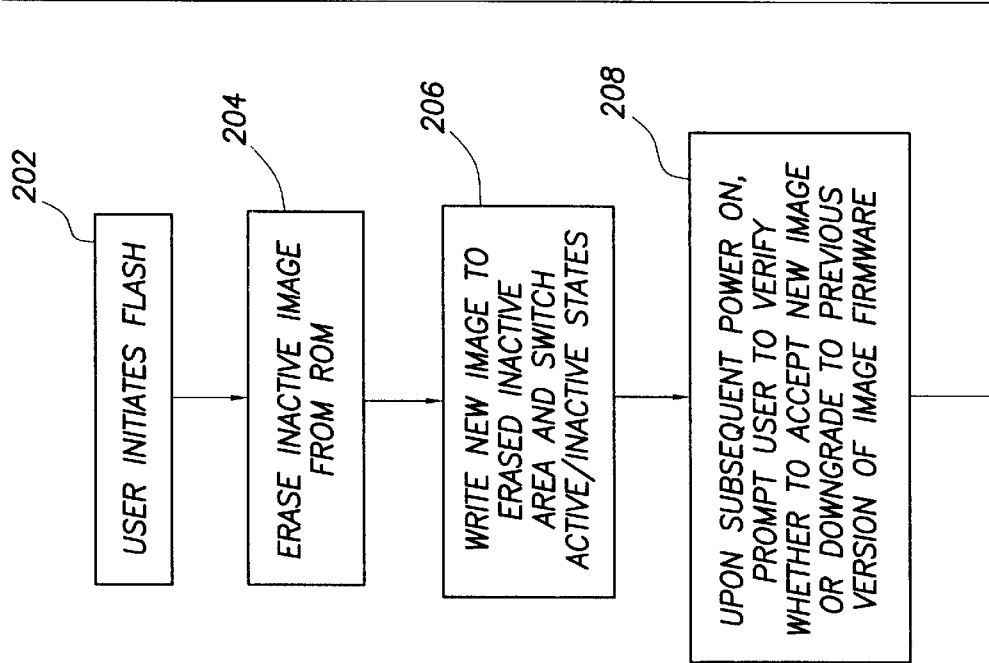

In accordance with the preferred embodiment, each firmware image A, B can be flashed separately. As such, if power is lost during flashing of one of the images, the other image still is available and the disk array controller 50 can recover using the available image. Thus, the ROM 60 of the preferred embodiment includes redundant firmware images to solve the problem noted above. FIGS. 4 and 5 include two methods of flashing the ROM 60 to take advantage of its inherent firmware image redundancy capability.

Referring first to FIG. 4, method 120 includes steps 122, 124, 126, 128, and 130. In step 122, the user initiates a ROM flash, presumably to upgrade the existing ROM 60 firmware. The flash begins in step 124 where the currently inactive image is erased in accordance with known ROM erasure techniques. Then, in step 126 the new firmware image is written to the inactive image area erased in step 124. If power is lost during while the new image is being written in step 126 the active image is still valid and available.

At some point in time after the new image is successfully flashed into the ROM, the active image can be flashed if desired to match the new inactive image. Accordingly, in step 128, the active image area is erased and written with the new image in step 130. If the flashing of the active image area in step 130 is interrupted, such as by a power loss, the inactive image, which was flashed in step 126, can be used to retry the flashing of the active image. At this point, both image areas A and B have been flashed with the new firmware image. Alternatively, after flashing the inactive image in step 126, the boot block code can switch the active/inactive states of the two images thereby making the newly flashed image the active image. Then, the old firmware image in the inactive area can be replaced with the new image.

FIG. 5 shows a method of flashing ROM 60 to permit the user to "downgrade" the ROM, if desired. Downgrading the ROM means that, after the user upgrades the inactive firmware image, the user can decide to change the image back to the previous version of the firmware before the upgrade. This capability permits, for example, the computer system 100 to be tested with new disk array controller firmware, and if the user is not satisfied with the performance of the disk array controller 50 using the new image, the user can have the old firmware image flashed back into the ROM 60.

In step 202, the user initiates the flash. The inactive area is erased (step 204) and loaded with the new firmware image (206). Also, the active/inactive status of the two images is switched so that the new firmware becomes active. Before flashing the active image area with the new firmware image, the user is prompted in step 208 to verify whether to permanently accept the newly flashed firmware or to downgrade the firmware to previous version. Preferably, the user is prompted after having tested the new firmware. A suitable time to ask the user whether to permanently accept the new firmware is during or after subsequent system power up. The boot block code preferably keeps a copy of the version of firmware loaded into each image area A and B. As such, the boot block code can determine whether the active image area contains a different version of firmware than the inactive image area. If the boot block code determines that the versions are, in fact, different, then boot block code can request the system to prompt the user, during or after the subsequent power up, that the inactive image area (now containing the old firmware) has a different version of firmware and whether the use wishes to upgrade the inactive image area to be identical to the active firmware image (now containing the new firmware).

In FIG. 5, this decision is shown as step 210. If the user does not wish to downgrade, meaning the user is satisfied with the performance of the new firmware image flashed into the ROM, then the inactive image area is flashed with the new firmware image in steps 212–216. In step 212, the inactive image area of ROM 60 is erased. In step 214, the firmware image from the active area is copied to RAM 62 and then written in step 216 to the inactive image area.

On the other hand, if the user wishes to go back to the old version of the firmware, then steps 218–222 are performed. The old version of firmware is the firmware image in the inactive image area. In step 218, the active image area is erased. In step 220, the firmware image from the inactive area is copied to RAM 62 and then written in step 222 to the active image area to complete the downgrade process.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor;
   a re-programmable non-volatile memory device coupled to said processor;
   volatile memory coupled to said processor;
   said non-volatile memory containing at least two portions wherein each portion contains a firmware image, one of said firmware images being an active image that is executed by said processor while the other firmware image being an inactive image that is not executed by the processor but could be made active to permit execution by the processor,
   each firmware image includes executable code that permits one of the firmware images to be reprogrammed, then the other firmware image.

2. The computer system of claim 1 wherein said non-volatile memory comprises a reprogrammable ROM.

3. The computer system of claim 1 wherein the firmware images comprise executable instructions that are used to control cycles to a disk drive.

4. The computer system of claim 1 further including a boot block code that designates which image is the active image and which image is the inactive image, and calculates a checksum for the active image and, if said checksum fails, designates the inactive image to be the active image to be executed by the processor.

5. The computer system of claim 1 further including a disk array controller and said non-volatile memory and said processor are part of the disk array controller.

6. The computer system of claim 1 wherein after the active image is reprogrammed, a user is prompted whether to reprogram the inactive image.

7. The computer system of claim 6 wherein if the user elects not to reprogram the inactive image, the inactive image is copied to the active image.

8. A reprogrammable non-volatile memory device comprising at least two portions wherein each portion contains a firmware image executable by a processor, one of said firmware images being an active image that is executed by the processor while the other firmware image being an inactive image that is not executed by the processor but could be made active to permit execution by the processor, each firmware image includes executable code that permits one of the firmware images to be reprogrammed, followed by reprogramming the other firmware image.

9. The reprogrammable non-volatile memory device of claim 8 further including a boot block which contains code that designates one of the firmware images to be the active image and the other firmware image to be the inactive image.

10. The reprogrammable non-volatile memory device of claim 9 wherein said boot block code verifies a checksum for the active firmware image and, if the checksum fails, designates the inactive image to be the active image.

11. A computer system, comprising:

a processor;

a re-programmable non-volatile memory device coupled to said processor;

volatile memory coupled to said processor;

said non-volatile memory containing at least two portions wherein each portion contains a firmware image, one of said firmware images being an active image that is executed by said processor while the other firmware image being an inactive image that is not executed by the processor but could be made active to permit execution by the processor, each firmware image includes executable code that first reprograms the inactive firmware image and switches the active/inactive states of the firmware images and after the computer system reboots, prompts a user to determine whether the inactive firmware image should also be reprogrammed, and reprogramming the inactive firmware image if the user so indicates.

12. The computer system of claim 11 wherein if the user requests the inactive firmware image to be reprogrammed, copying the active firmware image to said volatile memory and writing the active firmware image from said volatile memory to the portion of said non-volatile memory containing the inactive firmware image.

13. The computer system of claim 11 wherein, if the user does not request the inactive firmware image to be reprogrammed, copying the inactive firmware image to said volatile memory and then writing said inactive firmware image from said volatile memory to the portion of said non-volatile memory containing the active firmware image.

14. A re-programmable non-volatile memory device usable in a computer system comprising at least two portions wherein each portion contains a firmware image executable by a processor, one of said firmware images being an active image that is executed by the processor while the other firmware image being an inactive image that is not executed by the processor but could be made active to permit execution by the processor, and including boot block code that directs the inactive firmware image to be reprogrammed and changes the active/inactive state of the two images and then prompts a user to determine whether the inactive firmware image should also be reprogrammed, and reprogramming the inactive firmware image if the user so indicates.

15. The reprogrammable non-volatile memory device of claim 14 wherein said boot block code designates which image is active and which is inactive.

16. A method of flashing a ROM containing at least two firmware images, comprising:

(a) erasing only one firmware image;

(b) writing a new firmware image to the ROM to replace the image erased in (a);

(c) then, erasing a second firmware image stored on the ROM;

(d) writing the new firmware image to the ROM to replace the image erased in (c).

17. A method of flashing a ROM containing at least two firmware images, comprising:

(a) erasing a first firmware image;

(b) writing a new firmware image to the ROM to replace the first firmware image erased in (a);

(c) prompting a user to flash a second firmware image, and if the user decides to flash the second firmware image, then:

(c1) erasing the second firmware image; and (c2) writing the new firmware image to the ROM to replace the second firmware image erased in (c1).

18. The method of claim 17 wherein if the user decides not to flash the other firmware image, then:

(d) replacing the firmware image written in (b) with the second firmware image.

19. The method of claim 18 wherein (d) includes writing the second firmware image to a memory device and writing the second firmware image from the memory device to the firmware image written in (b).

A marked up version of the amended claims, showing the changes by underlining of the added text and bracketing of the deleted text, is appended hereto.

* * * * *